Feb. 28, 1956 R. F. ANDERSON 2,736,480
MULTIFLOW FILLER NOZZLE FOR PLASTIC COMESTIBLES
Filed April 18, 1952 2 Sheets-Sheet 1

Inventor
Ralph F. Anderson
By McCanna and Morsbach
Attys.

Feb. 28, 1956     R. F. ANDERSON     2,736,480
MULTIFLOW FILLER NOZZLE FOR PLASTIC COMESTIBLES
Filed April 18, 1952     2 Sheets-Sheet 2
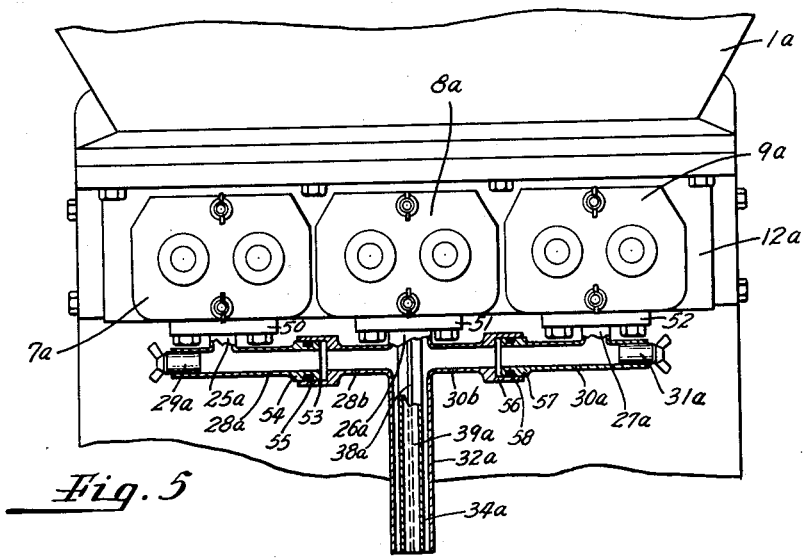
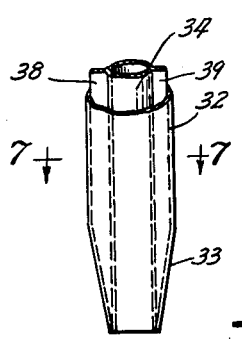
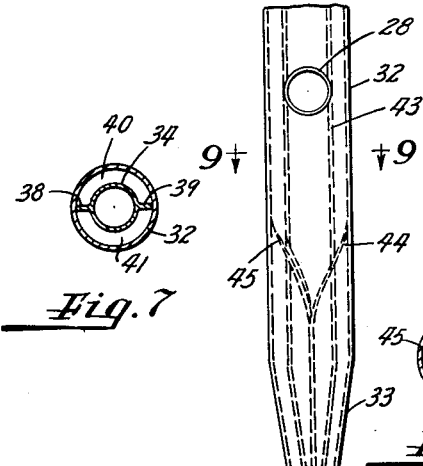
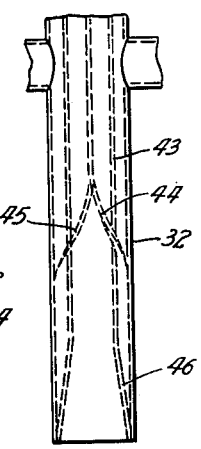
Fig.6    Fig.7    Fig.8    Fig.9    Fig.10
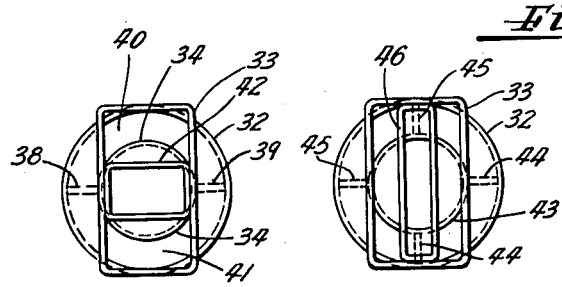
Fig.11    Fig.12
Inventor
Ralph F. Anderson
By McCanna and Morsbach
Attys.

United States Patent Office 2,736,480
Patented Feb. 28, 1956

2,736,480

MULTIFLOW FILLER NOZZLE FOR PLASTIC COMESTIBLES

Ralph F. Anderson, Rockford, Ill.

Application April 18, 1952, Serial No. 282,931

15 Claims. (Cl. 226—100)

This invention relates to a multi-flow filler nozzle for plastic comestibles, such as ice cream.

It is an object of this invention to provide a multi-flow filler nozzle for plastic comestibles, such as ice cream and the like, which is constructed in a novel manner facilitating its maintenance in a sanitary condition.

Another object of this invention is to provide a multi-flow filler nozzle for plastic comestibles which is of separable construction facilitating its ready disassembly for cleaning purposes.

A further object of this invention is to provide a filler nozzle of novel construction for simultaneously feeding comestible material from three separate sources in three separate flows through a single filling spout to a common receptacle.

It is also an object of this invention to provide a filler nozzle of novel construction for simultaneously filling a single receptacle with differently flavored plastic comestible material with the flavors extending lengthwise or crosswise in the receptacle, as desired.

Yet another object of this invention is to provide a multi-purpose filler nozzle adapted for selectively feeding one, two or three flavors of ice cream from three sources to a common receptacle.

Other and further objects and advantages of the invention will be apparent from the following description of preferred embodiments thereof, which are illustrated in the accompanying drawings to illustrate the principles of the invention.

In the drawings:

Figure 5 is a view similar to Fig. 1 but showing another form of filler nozzle assembly according to the present invention;

Figure 6 is a fragmentary side view, partly broken away, of one form of the discharge spout in the nozzle assembly of either Fig. 1 or Fig. 5;

Figure 7 is a section along the line 7—7 in Fig. 6;

Figure 8 is a side view of another form of the discharge spout, which may be used in the nozzle assembly of either Fig. 1 or Fig. 5;

Figure 9 is a section along the line 9—9 in Fig. 8;

Figure 10 is a front view of the Fig. 8 discharge spout;

Figure 11 is an enlarged bottom view of the Fig. 6 discharge spout; and

Figure 12 is an enlarged bottom view of the Fig. 8 discharge spout.

In the following description, the filler nozzle is described in terms of its use in feeding ice cream in a plastic state to the receptacle to be filled. However, it is to be understood that the invention is equally applicable to use with other materials, and particularly edible materials, having flow characteristics similar or analogous to ice cream.

Figure 1:
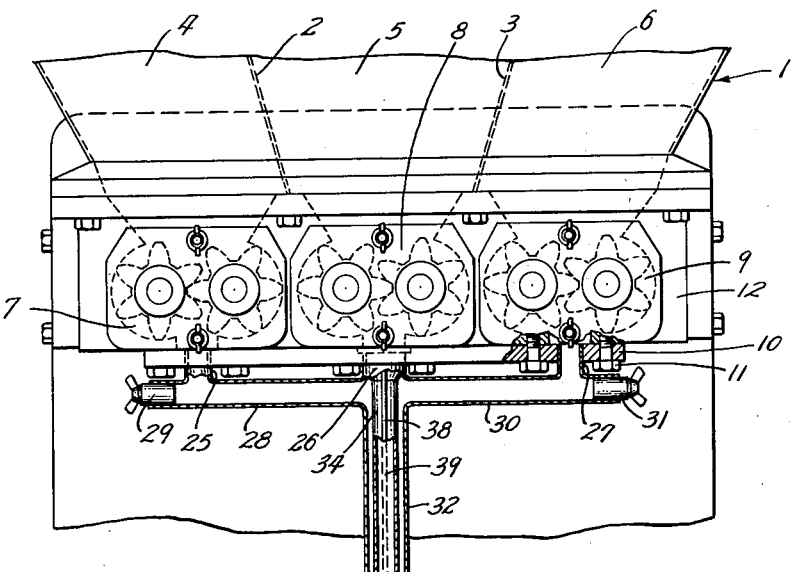
Figure 1 is a front view, with parts broken away, of one form of the filler nozzle assembly of the present invention mounted on a supporting housing and having three separate ice cream sources disposed above it.
Figure 2:
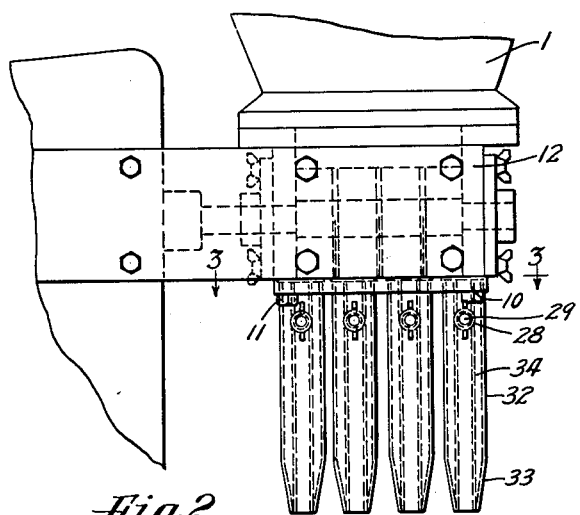
Figure 2 is an end view of the Fig. 1 nozzle assembly mounted on the supporting housing.
Figure 3:
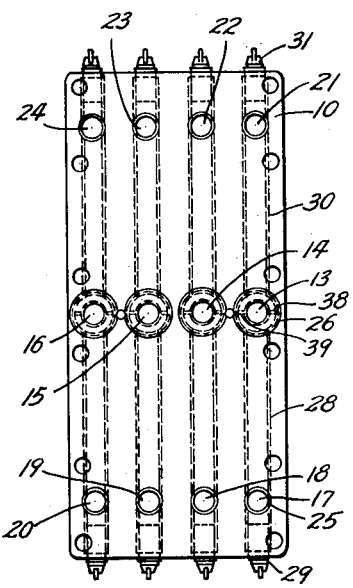
Figure 3 is a top view of the Fig. 1 nozzle assembly removed from the supporting housing.

Referring to Figs. 1–3, the overall assembly with which the present invention is intended to be used includes a rigidly supported hopper 1, which has spaced internal partitions 2 and 3 dividing the hopper into three separate compartments 4, 5 and 6 for ice cream which may be differently flavored. A first gear pump assembly 7 is disposed immediately below the hopper compartment 4 and communicates therewith for discharging ice cream therefrom. A second gear pump assembly 8 and a third gear pump assembly 9 are also similarly arranged to discharge ice cream from the hopper compartments 5 and 6, respectively.

An upper plate 10 of the filler nozzle assembly is releasably bolted, by means of threaded bolts 11, to the underside of the pump housing 12. As best seen in Fig. 3, plate 10 is formed with four centrally located downwardly extending holes 13, 14, 15 and 16 positioned to receive the ice cream discharged from the central pump assembly 8. Adjacent one end the plate 10 has four similar holes 17, 18, 19 and 20 located to pass the ice cream from the corresponding pump set 7, while adjacent its opposite end the plate 10 is formed with an additional four holes 21, 22, 23 and 24 for receiving the ice cream from the other pump set 9.

A depending vertical tubular segment 25 is rigidly secured, as by welding, to the attachment plate 10 at the hole 17 therein so as to receive the ice cream discharged therethrough. A larger vertical tubular leg 26 (Fig. 4) is similarly secured to plate 10 at the central hole 13 therein, and a tubular leg 27 similarly extends down from the hole 21 at the opposite end of plate 10. The depending tubular legs 25 and 26 are interconnected by a horizontal tubular portion 28 of uniform-diameter smooth bore construction which communicates with both legs 25 and 26 and has its outer end beyond the tubular leg 25 closed by a removable expansion plug 29 of resilient material, such as rubber. Likewise, an identical horizontal tube 30 extends between the central tubular vertical leg 26 and the tubular vertical leg 27 at the other end of attachment plate 10, with the free end of this tube beyond leg 27 being closed by an identical removable plug 31.

An outer vertical tube 32 is connected to both of the horizontal tubes 28 and 30 and extends downwardly therefrom in alignment with the central tubular leg 26 to, in effect, form a continuation of this vertical leg. As best seen in Fig. 2, tube 32 is circular in cross-section for most of its length and at its lower end 33 tapers inwardly from the front and from the rear to have an oblong discharge end.

It is to be understood that each of the other three centrally disposed discharge spouts in the assembly of Figs. 1–3 has an identical construction to that described above, for feeding ice cream from the opposite ends of the assembly to the outer tube of the central discharge spout.

Figure 4:
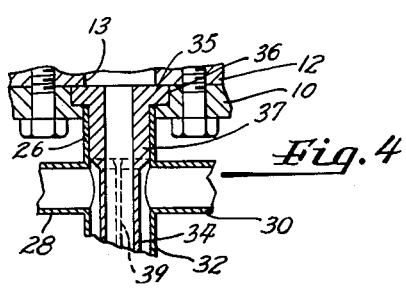
Figure 4 is a fragmentary section showing the mounting for the upper end of the filling spout in Fig. 1.

At the discharge spout, there is also located a separably mounted inner tube 34, which has an integral enlarged transverse flange 35 at its upper end (Fig. 4). This flange of the inner tube 34 is snugly seated in a complementary annular depression 36 formed in the upper face of the attachment plate 10. When assembled, the upper face of the flange 35 on the inner tube 34 is flush with the upper face of the attachment plate 10. Immediately below flange 35, the inner tube is enlarged at 37 to fit snugly within the depending tubular leg 26. Below this snugly fitting portion 37, the inner tube 34 has its outer diameter reduced so as to provide communication between the outer tube 32 at the spout and the horizontal tubes 28 and 30.

In Figs. 1–4, the inner tube 34 at the discharge spout is shown as being formed with a diametrically opposed pair of straight external ribs 38 and 39, which extend outwardly from the inner tube 34 to snugly engage the interior wall of the outer tube 32. This construction is shown in detail in Figs. 6, 7 and 11. By virtue of this construction, the generally annular space between the outer and inner tubes 32 and 34 is divided into two separate passageways 40 and 41, which communicate respectively with the horizontal tubes 28 and 30 to pass the ice cream therefrom in separate flows. At the same time, the ice cream from the central compartment 5 in the trough flows down through the inner tube 34 in a stream separate from both of the other flavors in the passages 40 and 41.

Fig. 11 shows in enlarged detail the generally rectangular outline of the lower end 33 of the outer tube 32. The inner tube 34 also terminates at its lower end in a generally rectangular oblong portion 42 which extends completely across the middle area of the lower end 33 of the outer tube 32. Since the receptacle to be filled has, of course, a cross-section similar to that of the lower end 33 of the outer tube 32 (usually being shaped to snugly surround the same), the separate flavors with this arrangement of the discharge spout will extend crosswise of the receptacle.

In some instances, customers prefer the flavors to extend lengthwise of the receptacle. To this end, the inner tube 34 of Figs. 1–4, 6, 7 and 11 may be removed from the outer tube 32 and replaced by the inner tube 43, shown in Figs. 8–10 and 12. This inner tube is releasably mounted in the same fashion on the attachment plate 10 to extend downward within the outer tube 32 and to provide communication between the horizontal tubes 28 and 30 and the outer tube 32. Inner tube 43 is formed with a pair of downwardly extending outer ribs 44 and 45, which snugly engage the interior of outer tube 32 to form two separate passageways between outer tube 32 and the inner tube 43. However, instead of being straight, these ribs 44 and 45 spiral gradually around the inner tube 43 through 90 degrees, so as to displace the end flavors 90 degrees as they flow downward through the discharge spout. At its lower end, the inner tube 43, which is circular in cross-section for most of its extent, flares outwardly at 46 to form an oblong discharge end which engages the interior of the oblong discharge end 33 of the outer tube 32 and extends completely thereacross lengthwise. Thus, with this construction of the inner nozzle in the discharge spout, the separate flavors are discharged to extend lengthwise of the receptacle.

Since the filler nozzle is intended primarily for feeding comestible products, such as ice cream, it is quite important that it be kept in a sanitary condition. The described construction of the present invention facilitates the ready disassembly of the nozzle for cleaning in the following manner:

The attachment plate 10 is unbolted from the pump housing 12 and each of the inner tubes at the four discharge spouts is lifted out of the corresponding outer tube. The outer tube 32 and the aligned tubular leg 26 at the discharge spout may be cleaned by a brush inserted from the upper end of the tubular leg 26. The end tubular legs 25 and 27 may be cleaned by brushes inserted from their upper ends, through the attachment plate 10. By removing the closure plugs 29 and 31, the uniform bore horizontal tubes 28 and 30 may be cleaned by brushes inserted from their now-open free ends. The interior passage in the inner tube 34 may be cleaned by a brush inserted from its upper end, and the external ribs 38 and 39 on the inner tube 32 are readily accessible for cleaning.

In the nozzle assembly shown in Fig. 5, there are provided three attachment plates 50, 51 and 52, releasably secured respectively to the pump housing 12a beneath the gear pump sets 7a, 8a and 9a, each of which discharges ice cream from a separate source. A vertical tubular leg 25a extends downward from the attachment plate 50 and communicates with a uniform smooth bore horizontal tube 28a, which has its outer end closed by a removable expansion plug 29a of resilient material. At the opposite end of the pump housing 12a, a vertical tubular leg 27a extends downward from the attachment plate 52 and is joined to a uniform smooth bore horizontal tube 30a, which has its outer end closed by expansion plug 31a.

Horizontal tubes 28b and 30b having uniform smooth bores extend outward from the central vertical tubular leg 26a and the outer tube 32a of the discharge spout, tubular leg 26a being rigidly secured to attachment plate 51 to extend downward therefrom. At its outer end 53 tube 28b is enlarged and counterbored to snugly telescopically receive an enlarged head 54 on the inner end of tube 28a. The head 54 is formed with an annular peripheral groove in which a resilient O-ring 55 is seated to prevent leakage around this connection between the horizontal tubes 28a and 28b and to provide a separable frictional attachment at this point. Similarly, tube 30b has its outer end 56 enlarged and counterbored to snugly receive the enlarged head 57 on the inner end of tube 30a, an O-ring 58 being carried by the head 57, for the same purpose.

The inner tube 34a at the discharge spout is suitably formed with external ribs 38a and 39a shaped and dimentioned to engage the interior of the outer tube 32a to separate the ice cream flowing from the passageway formed by vertical tubular leg 25a and horizontal tubes 28a and 28b from the ice cream flowing from the passageway formed by vertical tubular leg 27a and horizontal tubes 30a and 30b. Inner tube 34a is separably mounted at the discharge spout in the same manner as the mounting for tube 34 in the form of the invention shown in Figs. 1–4, with the top face of the flange at its upper end (not shown) lying flush with the top face of attachment plate 51.

It is to be understood that the inner tube 34a may have either straight or spiraled ribs, as desired, depending upon the way it is desired to have the flavors extend in the receptacle. Further, any desired number of discharge spouts may be provided with this assembly, with the central attachment plate 51 serving to mount all of the discharge spouts, and the end attachment plates 50 and 52 mounting all of the vertical tubular legs at the respective opposite ends of the pump housing.

For cleaning this assembly the separate attachment plates 50, 51 and 52 are unbolted from the pump housing, the horizontal tubes 28a and 28b are detached from one another, and the horizontal tubes 30a and 30b are detached from one another. After the inner tube 34a at the discharge spout is removed from the outer tube 32a, the latter may be cleaned by a brush inserted from its upper end at the vertical tubular leg 26 and the attachment plate 51. The horizontal tubes 28b and 30b may be cleaned respectively by a brush inserted from the outer end of either. The interior and exterior surfaces of the inner tube 34a at the discharge spout may be cleaned as in the embodiment of the invention shown in Figs. 1–4. The vertical tubular legs 25a and 27a may be cleaned by brushes inserted from their respective upper ends. After removing the plugs 29a and 31a, the horizontal tubes 28a and 30a may be cleaned by a brush inserted from either end.

While in the foregoing description there are disclosed specific preferred forms of the present invention, it is to be understood that various modifications, omissions and refinements departing from the described forms of the invention may be adopted without departing from the spirit and scope of my invention. Obviously, the number of discharge spouts in the assembly may be varied to suit the requirements of the user. Also, while the invention has been shown in conjunction with three separate ice cream sources, it is to be understood that these sources may be all of one flavor, or two of the same, or three different flavors, as desired, since the invention is really adapted for all such applications.

I claim:

1. A multiple flavor filler nozzle for filling a receptacle with a plurality of layers of ice cream and the like comprising a downwardly extending outer nozzle tube having a discharge outlet at its lower end, an inner nozzle tube disposed within the outer nozzle tube in annularly spaced relation thereto and approximately coextensive therewith having an inlet at its upper end to communicate with a first source of material and a discharge outlet at its lower end, a plurality of supply passages extending laterally from said outer tube and communicating therewith at spaced locations therearound, said supply passages having inlets in spaced relation to said outer tube for communication with separate sources of material, and ribs extending across the annular space between said nozzle tubes to separate the respective flows from said supply passages through said annular space, said ribs extending downwardly along the nozzle tubes to divide said annular space into separate passages for segregated flows therethrough of material from said supply passages.

2. The combination of claim 1 wherein the upper end of the inner nozzle tube is snugly received within the upper end of the outer nozzle tube with a sliding fit to separably position the inner tube and close the upper end of the outer tube.

3. The combination of claim 1 wherein said supply passages are formed by straight tubes which interseat and communicate with the outer nozzle tube intermediate its ends at diametrically opposite points thereon and each of the supply tubes has an offset tubular inlet disposed in parallelism with the nozzle tubes.

4. The combination of claim 3 wherein the supply tubes extend beyond the tubular inlets and releasable closures are disposed at the ends of the supply tubes to close the same whereby removal of the closures provides a straight passage through the supply tubes and outer nozzle tube for the passage of a cleaning brush.

5. The combination of claim 3 wherein each of the supply tubes comprises two sections interconnected in end to end relationship at a point between the nozzle tube and the supply tube inlet.

6. The combination of claim 3 wherein each of the supply tubes comprises a section integral with the outer nozzle tube and an extension section having an offset tubular inlet, one of the sections having a female end and the other of the sections having a male end receivable therein and a seal between the interfitting ends of the sections to prevent leakage when the ends are slid into assembled end to end relation.

7. A filler nozzle as defined in claim 1, wherein said outer nozzle tube at its lower end is flattened at opposite sides to provide a discharge outlet of approximately rectangular cross-section, and the inner tube is flattened at opposite sides at its lower end to provide a discharge outlet of approximately rectangular cross-section extending completely across a middle portion of the discharge outlet of the outer tube to provide separate discharge openings for the annular passages.

8. The combination of claim 1 wherein said outer nozzle tube at its lower end is inturned along two opposed sides and flattened to provide an end of approximately rectangular cross-section of unequal dimensions and the inner tube is inturned near its lower end on two opposed sides and flattened to provide a rectangular discharge outlet having its longest dimension extending crosswise of the end of the outer tube at a middle portion thereof disposed at the ends of the aforesaid ribs to thereby provide at the end of the nozzle separate rectangular discharge outlets for the inner tube and the annular passages.

9. The combination of claim 8 wherein the longest dimensions of the rectangular ends of the inner and outer tubes are positioned in parallelism and the ribs are in the form of spirals which turn through 90 degrees through the length of the annular space.

10. The combination of claim 2 wherein the ribs are affixed to the outer surface of the inner nozzle tube and the inner surface of the outer nozzle tube is plain and smooth for efficient cleaning.

11. The combination of claim 3 wherein the supply tubes are of rigid metal and extend beyond the tubular inlets and resilient expansion plus are disposed in the ends of the supply tubes to close the same whereby removal of the expansion plus provides a straight open ended passage through the supply tubes and the outer nozzle tube for the passage of a cleaning implement.

12. A multiple flavor nozzle for attachment to a filling machine to simultaneously fill a plurality of receptacles each with a plurality of layers of ice cream and the like comprising supporting means arranged to be secured in operative relation to a multiple source filling machine, a plurality of outer nozzle tubes having one end carried in said supporting means and depending therefrom in parallel coplanar spaced relationship each having a discharge outlet at its lower end, an inner nozzle tube disposed within each of the outer nozzle tubes in annularly spaced relation thereto and approximately coextensive therewith having an inlet at its upper end communicating with a source common to said inlets and a discharge outlet at its lower end, a bank of supply passages on each side of the plane of the nozzle tubes each bank having a passage communicating at one end with one of the outer nozzle tubes and extending laterally therefrom in coaxial relationship with a passage of the other bank, the passages of each bank having inlets through said supporting means communicating with second and third sources each of which is common to the inlets of one bank, a plurality of ribs extending across the annular space between the inner and outer nozzle tubes, said ribs extending downwardly along the nozzle tubes to divide said annular space into separate passages for segregated flows of the material from said supply passages to the discharge outlet.

13. A multiple flavor nozzle for attachment to a filling machine to simultaneously fill a plurality of receptacles each with a plurality of layers of ice cream and the like comprising supporting means arranged to be secured in operative relation to a multiple source filling machine, a plurality of outer nozzle tubes having one end carried in said supporting means and depending therefrom in parallel coplanar spaced relationship each having a discharge outlet at its lower end, an inner nozzle tube disposed within each of the outer nozzle tubes in annularly spaced relation thereto and approximately coextensive therewith having an inlet at its upper end communicating with a source common to said inlets and a discharge outlet at its lower end, a bank of supply tubes on each side of the plane of the nozzle tubes each bank having a tube communicating at one end with one of the outer nozzle tubes and extending laterally therefrom in coaxial relationship with a tube of the other bank, an inlet tube connected to each supply tube and said supporting means communicating with second and third sources each of which is common to the inlet tubes of one bank, a plurality of ribs extending across the annular space between the inner and outer nozzle tubes to separate the respective flows from said supply passages through said annular space, said ribs extending downwardly along the nozzle tubes to divide said annular space into separate passages for segregated flows of the material from said supply passages.

14. The combination of claim 13 wherein said supporting means comprises an attachment plate, said outer nozzle tubes and said inlet tubes are permanently affixed thereto and the plate has annular recesses about the ends of the outer nozzle tubes for the reception of each inner nozzle tube to removably support the inner tube within the outer tube.

15. The combination of claim 13 wherein said supporting means comprises an attachment plate to which said outer nozzle tubes are permanently affixed arranged to removably support the inner nozzle tubes, and separate attachment plates for each bank of inlet tubes and wherein said supply tubes each comprise two tubular pieces arranged in end to end position and a slip joint disposed between said pieces for separation of the parts in cleaning.

References Cited in the file of this patent

UNITED STATES PATENTS

| | | |
|---|---|---|
| 1,609,199 | Retzbach | Nov. 30, 1926 |
| 2,067,750 | Bagby | Jan. 12, 1937 |
| 2,147,686 | Bagby | Jan. 21, 1939 |